US012754390B2

(12) United States Patent
Fan et al.

(10) Patent No.: US 12,754,390 B2
(45) Date of Patent: Oct. 6, 2026

(54) DRIVING MECHANISM

(71) Applicant: Actutek Corporation, Taoyuan City (TW)

(72) Inventors: Kai-Po Fan, Taoyuan City (TW); Man-Ting Lu, Taoyuan City (TW); Shou-Jen Liu, Taoyuan City (TW)

(73) Assignee: ACTUTEK CORPORATION, Taoyuan City (TW)

( * ) Notice: Subject to any disclaimer, the term of this patent is extended or adjusted under 35 U.S.C. 154(b) by 0 days.

(21) Appl. No.: 18/944,391

(22) Filed: Nov. 12, 2024

(65) Prior Publication Data

US 2025/0155781 A1 May 15, 2025

Related U.S. Application Data

(60) Provisional application No. 63/597,919, filed on Nov. 10, 2023.

(51) Int. Cl.

| | |
|---|---|
| ***G02B 7/09*** | (2021.01) |
| ***G02B 7/18*** | (2021.01) |
| ***G02B 13/00*** | (2006.01) |
| ***G02B 27/64*** | (2006.01) |
| ***G03B 5/00*** | (2021.01) |
| ***G03B 5/02*** | (2021.01) |
| ***G03B 13/36*** | (2021.01) |
| ***H04N 23/51*** | (2023.01) |

(52) U.S. Cl.

CPC ............. *G02B 7/09* (2013.01); *G02B 7/1805* (2013.01); *G02B 13/001* (2013.01); *G02B 27/646* (2013.01); *G03B 5/00* (2013.01); *G03B 5/02* (2013.01); *G03B 13/36* (2013.01); *H04N 23/51* (2023.01); *G03B 2205/0007* (2013.01); *G03B 2205/0069* (2013.01)

(58) Field of Classification Search

CPC ...... G02B 13/001; G02B 27/646; G02B 7/08; G02B 7/09; G02B 7/1805; G03B 13/36; G03B 2205/0007; G03B 2205/0069; G03B 3/10; G03B 5/00; G03B 5/02; H04N 23/51

See application file for complete search history.

(56) References Cited

U.S. PATENT DOCUMENTS

| | | | | |
|---|---|---|---|---|
| 2016/0313568 A1* | 10/2016 | Ichihashi | ............. | G02B 27/646 |
| 2017/0212409 A1* | 7/2017 | Kim | ....................... | G03B 13/36 |
| 2022/0022321 A1* | 1/2022 | Han | ....................... | H05K 1/147 |
| 2022/0244621 A1* | 8/2022 | Sue | ....................... | G02B 26/08 |
| 2025/0147271 A1* | 5/2025 | Zhao | ................... | G02B 27/646 |

* cited by examiner

*Primary Examiner* — Amy R Hsu

(74) *Attorney, Agent, or Firm* — MUNCY, GEISSLER, OLDS & LOWE, P.C.

(57) ABSTRACT

A driving mechanism for moving an optical element is provided. The driving mechanism includes a fixed part, a movable part, and a driving assembly. The movable part is movably connected to the fixed part for holding the optical element. The driving assembly is configured for moving the movable part relative to the fixed part.

19 Claims, 19 Drawing Sheets

DRIVING MECHANISM

CROSS REFERENCE TO RELATED APPLICATIONS

This application claims the benefit of U.S. Provisional Application No. 63/597,919, filed Nov. 10, 2023, the entirety of which is incorporated by reference herein.

BACKGROUND OF THE INVENTION

Field of the Invention

The present invention relates to a driving mechanism, and, in particular, to a driving mechanism for moving an optical element.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

In some electronic devices, several coils and magnets corresponding thereto are usually used for adjusting the focus of a lens. However, miniaturization of these electronic devices may increase the difficulty of mechanical design, and it may also lead to low reliability and low driving force for moving the lens. Therefore, addressing the aforementioned problems has become a challenge.

BRIEF SUMMARY OF THE INVENTION

An embodiment of the present invention provides a driving mechanism for moving an optical element. The driving mechanism includes a fixed part, a movable part, and a driving assembly. The movable part is movably connected to the fixed part for holding the optical element. The driving assembly is configured for moving the movable part relative to the fixed part.

In some embodiments, the driving mechanism further includes a substrate and a circuit board. The fixed part includes a base and a housing connected to each other, the substrate is affixed to the base, and the circuit board is affixed in a cavity of the substrate. The driving assembly includes a first magnetic element disposed on the movable part and a first coil disposed on the substrate, wherein the circuit board and the first coil are disposed on opposite sides of the substrate.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
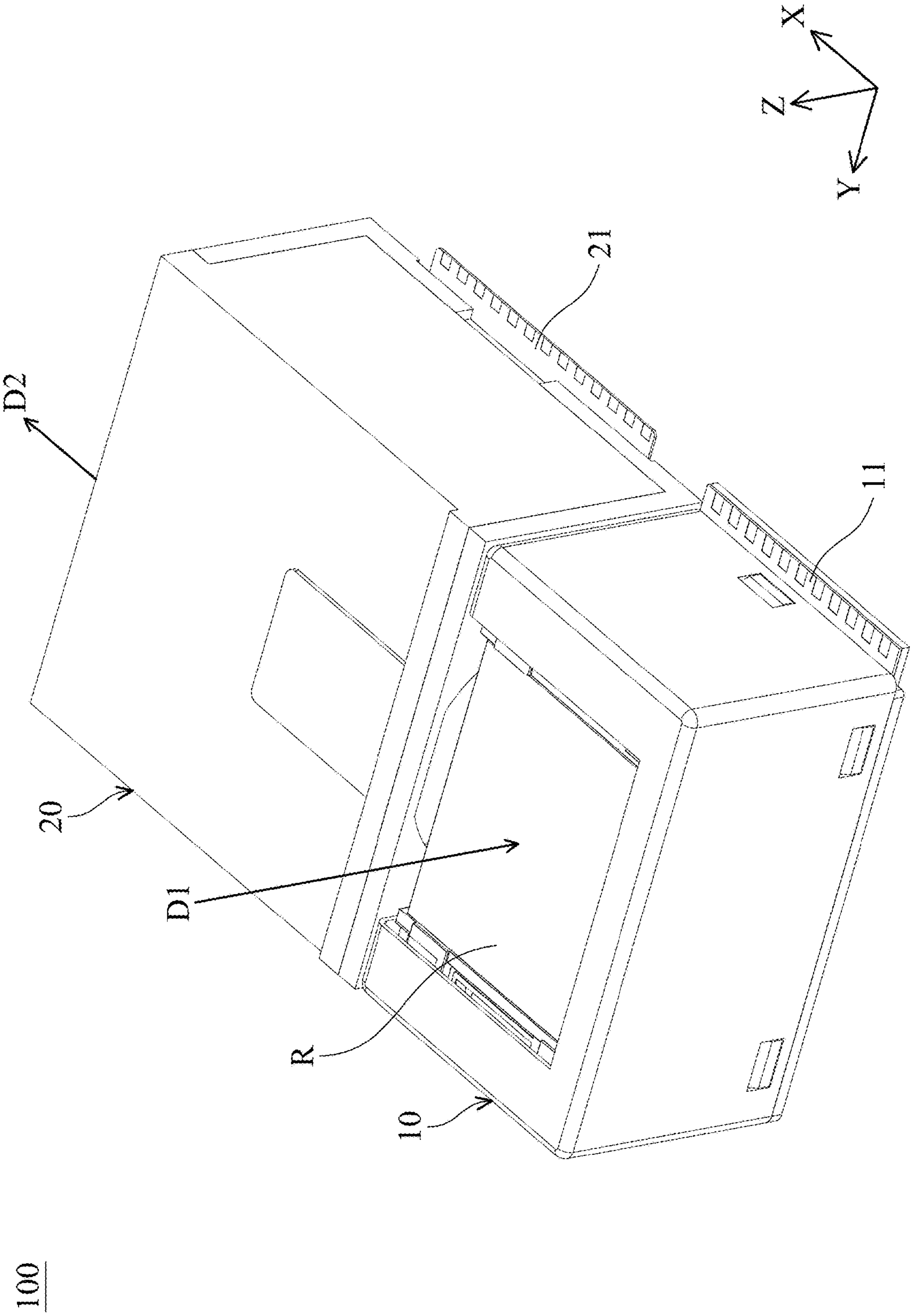
FIG. 1 shows a perspective diagram of an optical system 100 in accordance with an embodiment of the invention.
Figure 2:
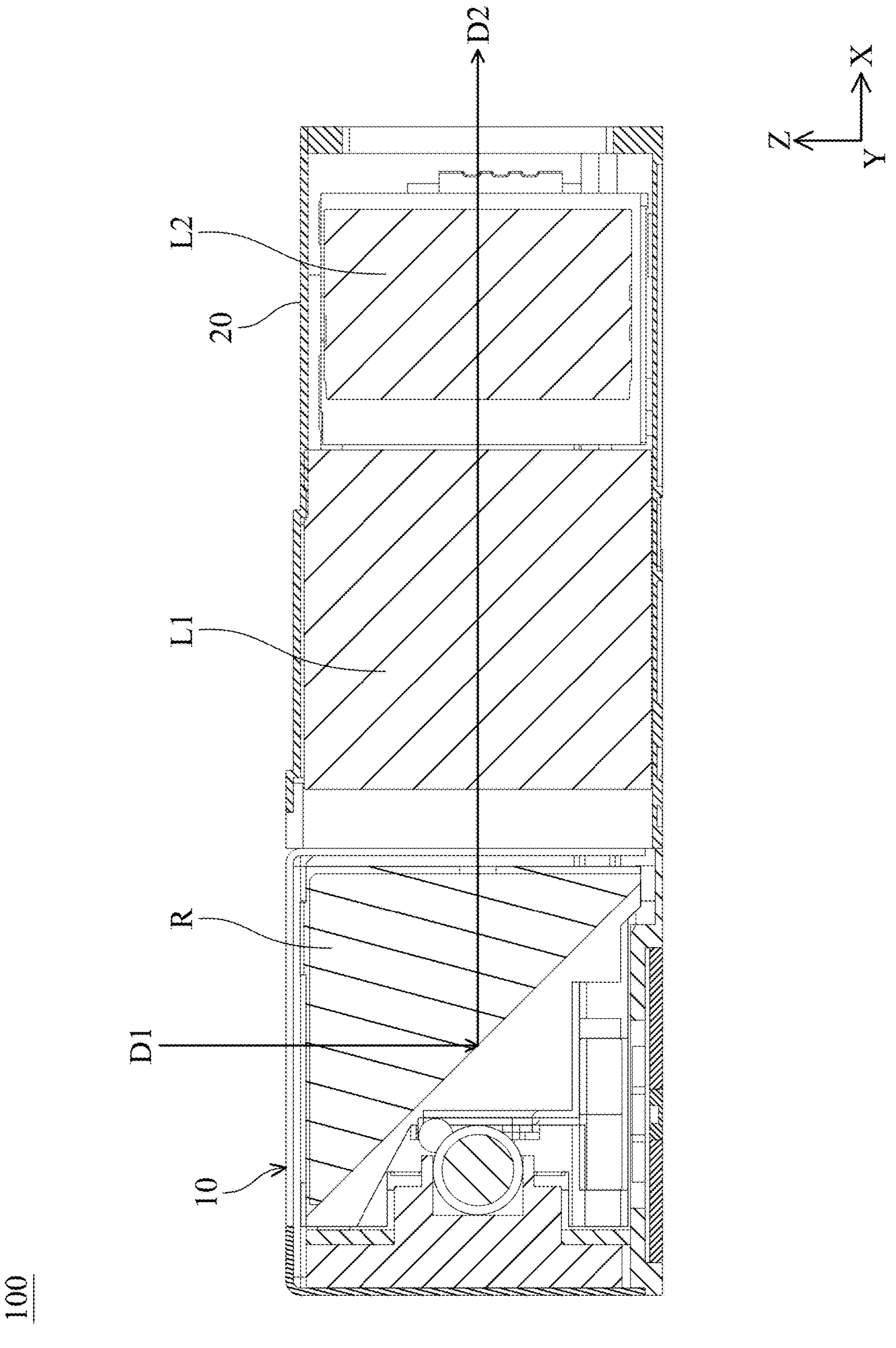
FIG. 2 shows a cross-sectional view of the optical system 100 in FIG. 1.
Figure 3:
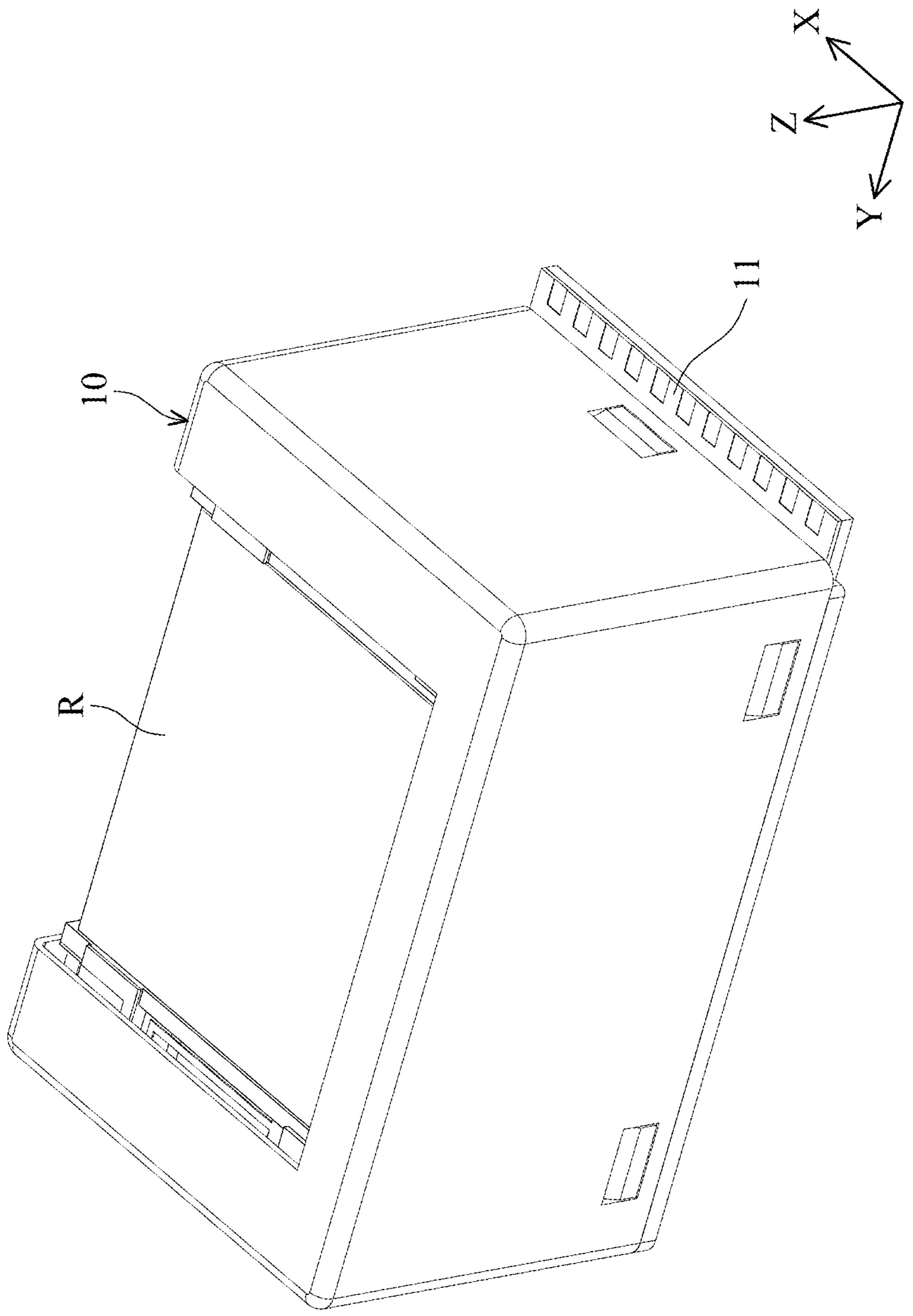
FIG. 3 shows a perspective diagram of the driving mechanism 10 in FIG. 1.
Figure 4:
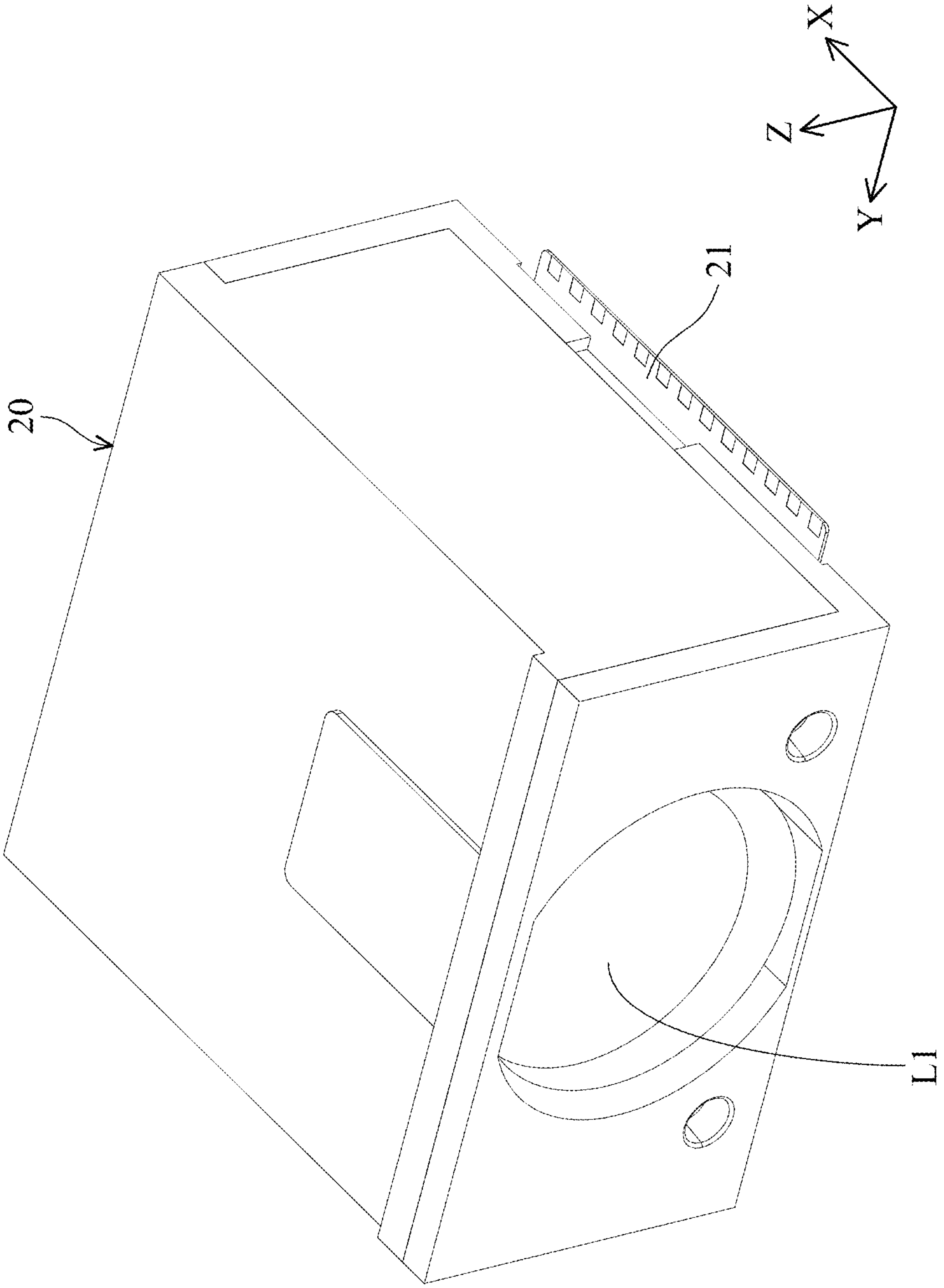
FIG. 4 shows a perspective diagram of the driving mechanism 20 in FIG. 1.

FIG. 1 shows a perspective diagram of an optical system 100 in accordance with an embodiment of the invention. FIG. 2 shows a cross-sectional view of the optical system 100 in FIG. 1. FIG. 3 shows a perspective diagram of the driving mechanism 10 in FIG. 1. FIG. 4 shows a perspective diagram of the driving mechanism 20 in FIG. 1.

Referring to FIGS. 1-4, the optical system 100 in this embodiment may be disposed in a cell phone or other portable electronic device. The optical system 100 primarily comprises two driving mechanisms 10, 20 and three optical elements R, L1, L2. The optical element R may be a prism that is disposed in the driving mechanism 10, and the optical elements L1, L2 may be optical lenses that are disposed in the driving mechanism 20.

In this embodiment, the driving mechanisms 10 and 20 may comprise Voice Coil Motors (VCMs) for rotating the optical element R and/or moving the optical element L2 along the X axis, thereby achieving the function of Auto Focusing (AF) or Optical Image Stabilization (OIS).

With the configuration as described above, external light can enter the optical element R in a vertical direction (−Z direction). External light is then reflected by the optical element R and propagates through the optical elements L1 and L2 in a horizontal direction (X direction). Subsequently, light propagates out of the optical system 100 and reaches an image sensor (not shown) to form a digital image.

As shown in FIGS. 1-4, two printed circuit elements 11, 21 (e.g. PCB or FPC) are disposed on the bottom side of the driving mechanisms 10 and 20. External circuit can apply current signals through the printed circuit elements 11, 21 to the coils in the driving mechanisms 10, 20. Hence, electromagnetic forces can be generated to rotate/move the optical elements R, L1, L2, thereby achieving the function of Auto Focusing (AF) or Optical Image Stabilization (OIS).

Figure 5:
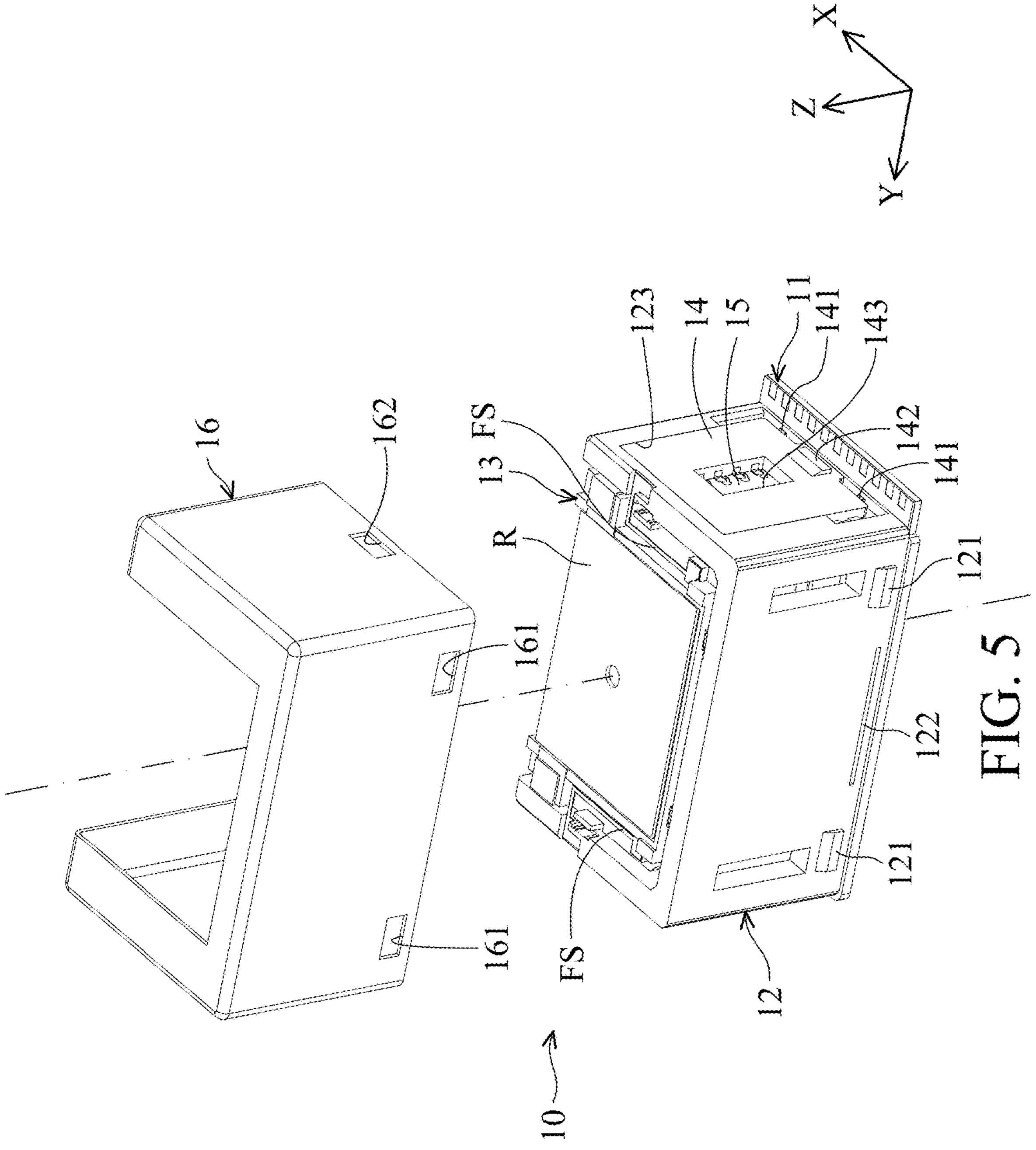
FIG. 5 shows an exploded diagram of the driving mechanism 10 in FIG. 3 with the housing 16 separated from the base 12.
Figure 6:
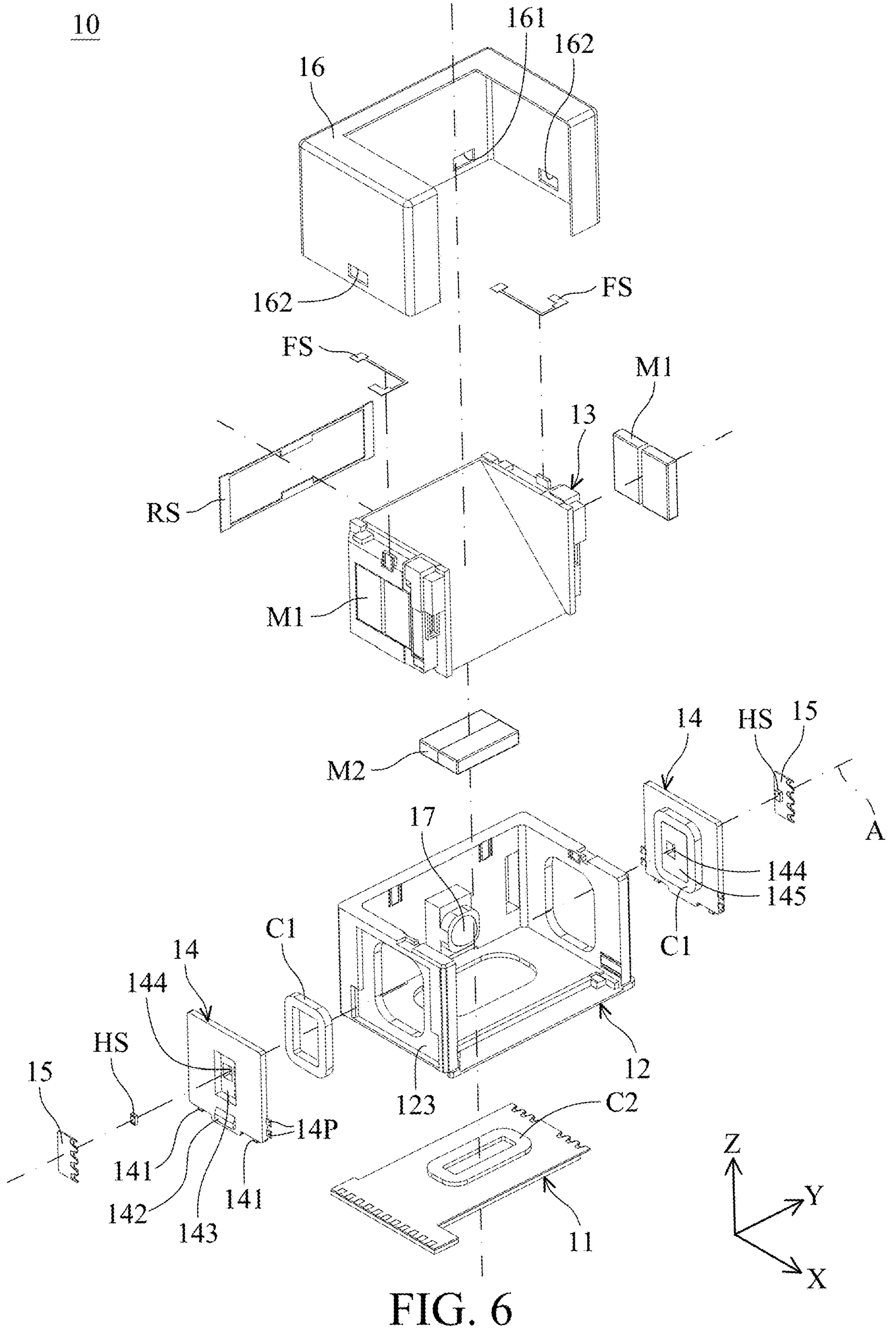
FIG. 6 shows another exploded diagram of the driving mechanism 10 in FIG. 3.
Figure 7:
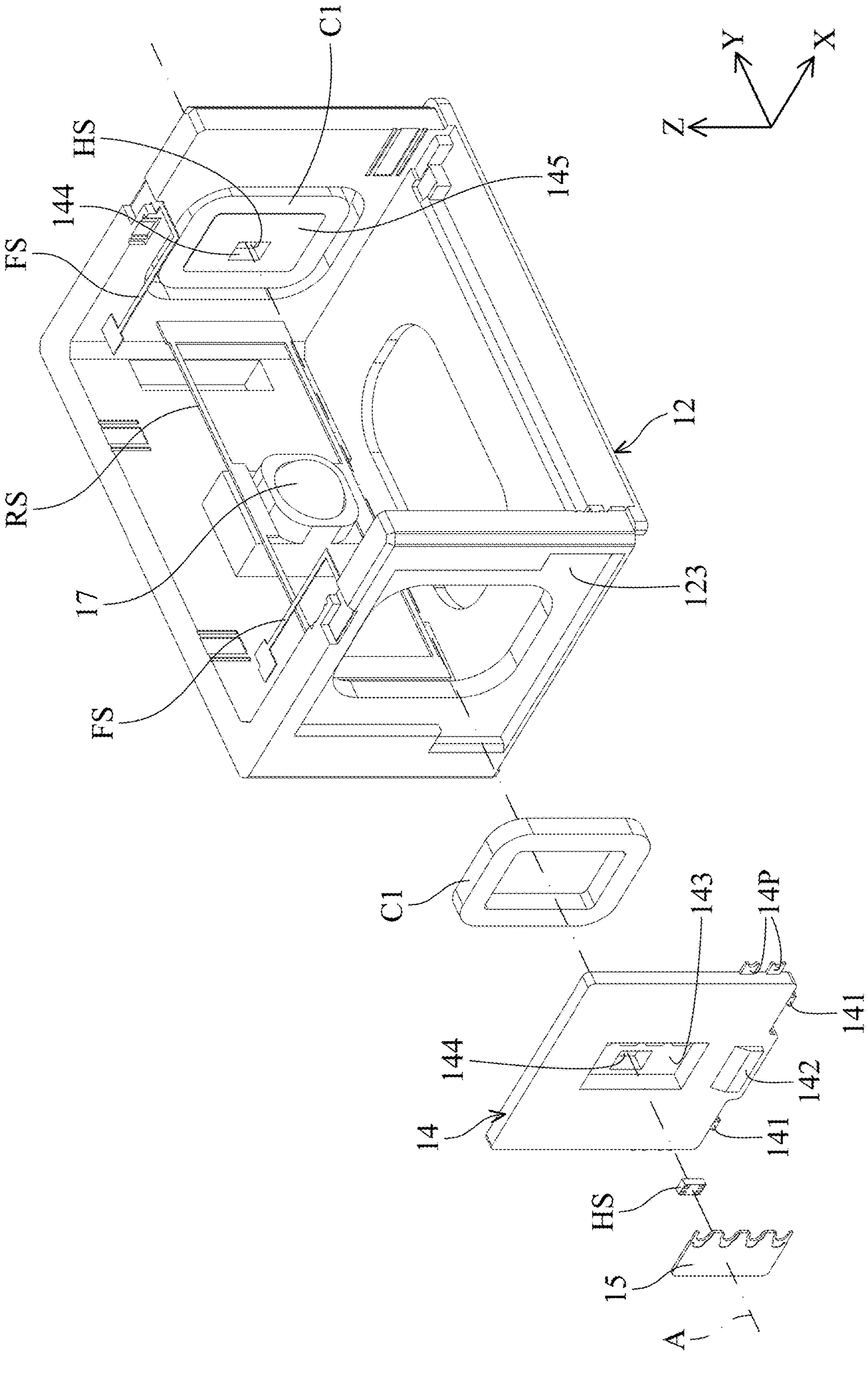
FIG. 7 shows an exploded diagram of the base 12, the ball joint 17, the top sheet spring FS, the rear sheet spring RS, the first coil C1, the substrate 14, the circuit board 15, and the sensor HS of the driving mechanism 10 in FIG. 6.
Figure 8:
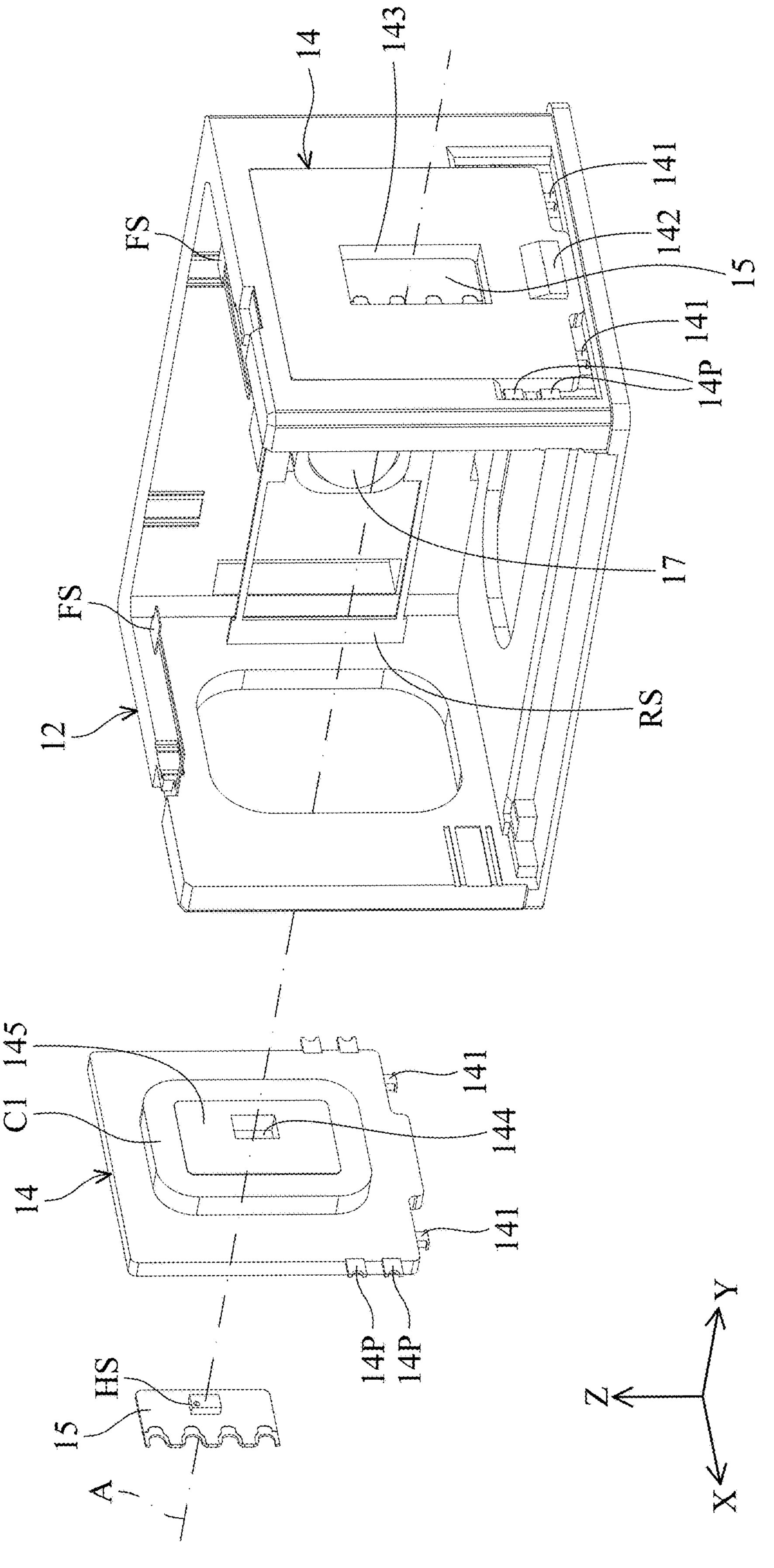
FIG. 8 shows another exploded diagram of the base 12, the ball joint 17, the top sheet spring FS, the rear sheet spring RS, the first coil C1, the substrate 14, the circuit board 15, and the sensor HS of the driving mechanism 10 in FIG. 6.
Figure 9:
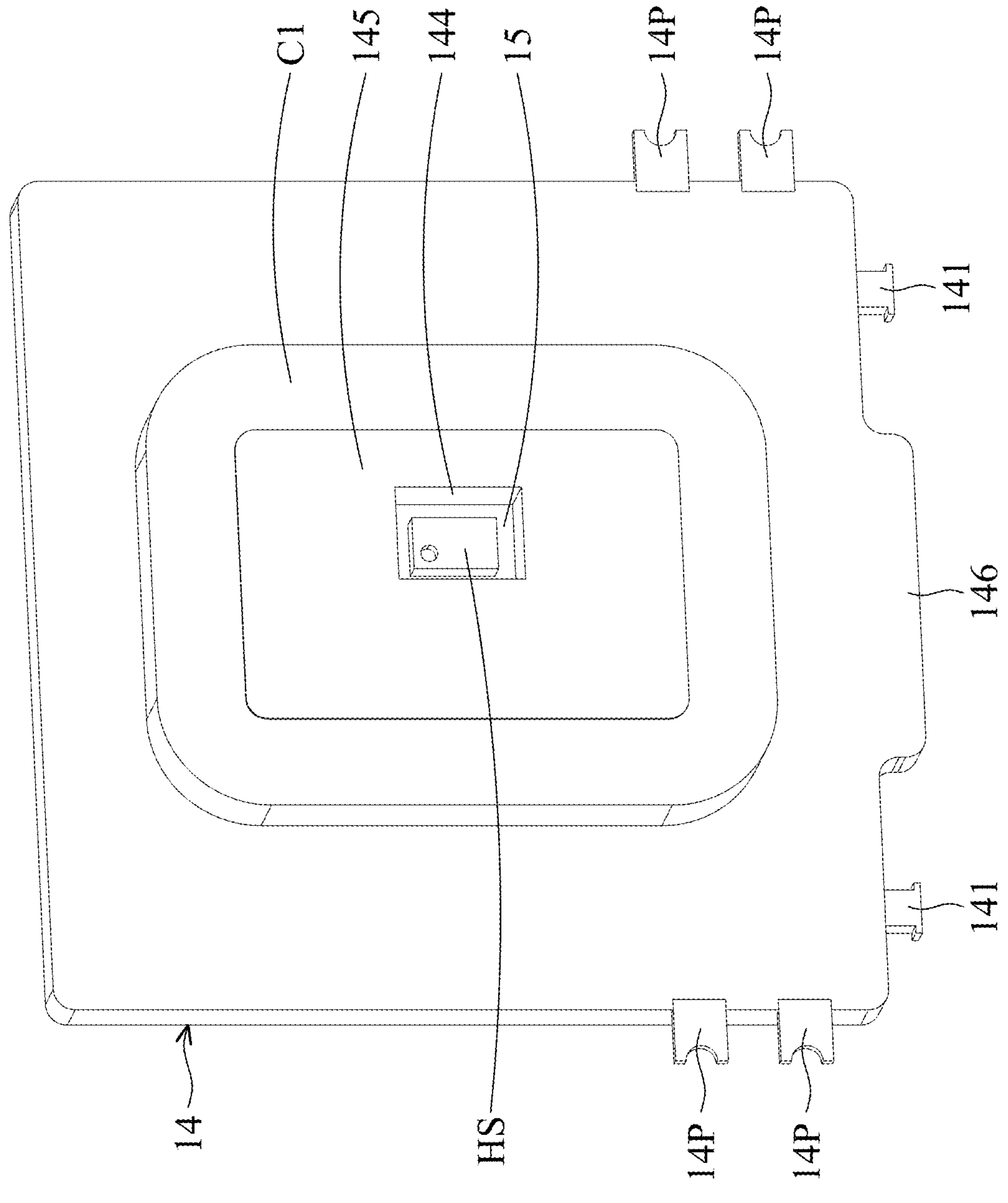
FIG. 9 shows a perspective diagram of the substrate 14, the circuit board 15, and the sensor HS of the driving mechanism 10 in FIGS. 5-8 after assembly.

FIG. 5 shows an exploded diagram of the driving mechanism 10 in FIG. 3 with the housing 16 separated from the base 12. FIG. 6 shows another exploded diagram of the driving mechanism 10 in FIG. 3. FIG. 7 shows an exploded diagram of the base 12, the ball joint 17, the top sheet spring FS, the rear sheet spring RS, the first coil C1, the substrate 14, the circuit board 15, and the sensor HS of the driving mechanism 10 in FIG. 6. FIG. 8 shows another exploded diagram of the base 12, the ball joint 17, the top sheet spring FS, the rear sheet spring RS, the first coil C1, the substrate 14, the circuit board 15, and the sensor HS of the driving mechanism 10 in FIG. 6. FIG. 9 shows a perspective diagram of the substrate 14, the circuit board 15, and the sensor HS of the driving mechanism 10 in FIGS. 5-8 after assembly.

Referring to FIGS. 5-9, the driving mechanism 10 in this embodiment primarily comprises a printed circuit element 11, a base 12, a holder 13, two substrates 14, tw circuit boards 15, a housing 16, a ball joint 17, at least a top sheet spring FS, and at least a rear sheet spring RS. The base 12 and the housing 16 are affixed to each other and form a fixed part of the driving mechanism 10.

The printed circuit element 11 is mounted to the bottom of the base 12. The top sheet springs FS and the rear sheet spring RS are connected between the holder 13 and the base 12, and the holder 13 is further hinged to the base 12 via the ball joint 17 which is disposed on the inner side of the base 12. Hence, the holder 13 and the optical element R on the holder 13 can be driven to rotate relative to the base 12, wherein the holder 13 constitutes a movable part of the driving mechanism 10.

In this embodiment, the top sheet springs FS are parallel to the XY plane, and the rear sheet spring RS is parallel to the YZ plane and perpendicular to the top sheet springs FS. However, the top sheet springs FS and the rear sheet spring RS may be parallel to each other but not coplanar, and the present invention is not limited to the embodiments.

Moreover, two first magnetic elements M1 are disposed on opposite sides of the holder 13, and a second magnetic element M2 is disposed on the bottom side of the holder 13. Two substrates 14 are affixed in the recesses 123 of the base 12, wherein two first coils C1 are disposed on the substrates 14, and a second coil C2 is disposed on the printed circuit element 11

It should be noted that the first and second coils C1 and C2 are positioned near the first and second magnetic elements M1 and M2 (e.g. magnets), respectively. The first and second coils C1, C2 and the first and second magnetic elements M1, M2 constitute a driving assembly of the riving mechanism 10 for rotating the holder 13 relative to the base 12.

When a current signal is applied to the first and second coils C1, C2, an electromagnetic force can be generated by the first and second coils C1, C2 and the first and second magnetic elements M1, M2. Thus, the holder 13 and the optical element R on the holder 13 can be driven to rotate relative to the base 12, and the function of Auto Focusing (AF) or Optical Image Stabilization (OIS) can be achieved.

It can be seen in FIGS. 5-6 that several slots 161, 162 are formed on the housing 16. During assembly, the nubs 121 on the base 12 are joined in the slots 161, and the nubs 142 on the substrate 14 are joined in the slots 162, whereby the housing 16 and the base 12 are firmly connected to each other.

As shown in FIG. 5, a slit 122 is formed on the base 12 and located between the two nubs 121. The slit 122 extends through a sidewall of the base 12, wherein the slit 122 and the nubs 121 are on the same side of the base 12. Specifically, the slit 122 is aligned to a gap between the holder 13 and the printed circuit element 11. During assembly, the components inside the base 12 can be observed and inspected through the slit 122, thus improving the yield rate of the products.

In this embodiment, two winding posts 141 are formed on the bottom side of the substrate 14. During assembly, two wires are provided to connect the first coil C1 to the winding posts 141, and the wires on the winding posts 141 can be bonded to the conductive members exposed to the surface of the base 12 by soldering/welding, wherein the conductive members are connected to an external circuit via the printed circuit element 11.

Here, the substrate 14 may be a plastic substrate, and the circuit board 15 may comprise an FPCB. The thickness of the substrate 14 may be equal to or greater than 0.2 mm (e.g. 0.5 mm), which is higher than the thickness of the circuit board 15 (e.g. 0.1 mm). A sensor HS (e.g. Hall effect sensor or other magnetic field sensor) is disposed on the circuit board 15 to detect the displacement of the first magnetic element M1. In some embodiments, the sensor HS may be replaced by other electronic element such as IC element or passive component, and the present invention is not limited to the embodiments.

It should be noted that a cavity 143 is formed on the outer side of the substrate 14, and a through hole 144 is formed at the bottom of the cavity 143. During assembly of the driving mechanism, the circuit board 15 is disposed in the cavity 143 with the sensor HS accommodated in the through hole 144. In some embodiments, the glue can be applied in the cavity 143 to adhere the substrate 14 and the circuit board 15 to the housing 16.

Moreover, a protrusion 145 is formed on the inner side of the substrate 14 and extends through the first coil C1. With the through hole 144 extending through the protrusion 145, the sensor HS can be exposed to the inner side of the substrate 14, as shown in FIGS. 7-9. In this embodiment, a central axis A is parallel to the Y axis and extends through the circuit boards 15, the sensor HS, the substrate 14, the first coil C1, and the recess 123 of the base 12.

Figure 10:
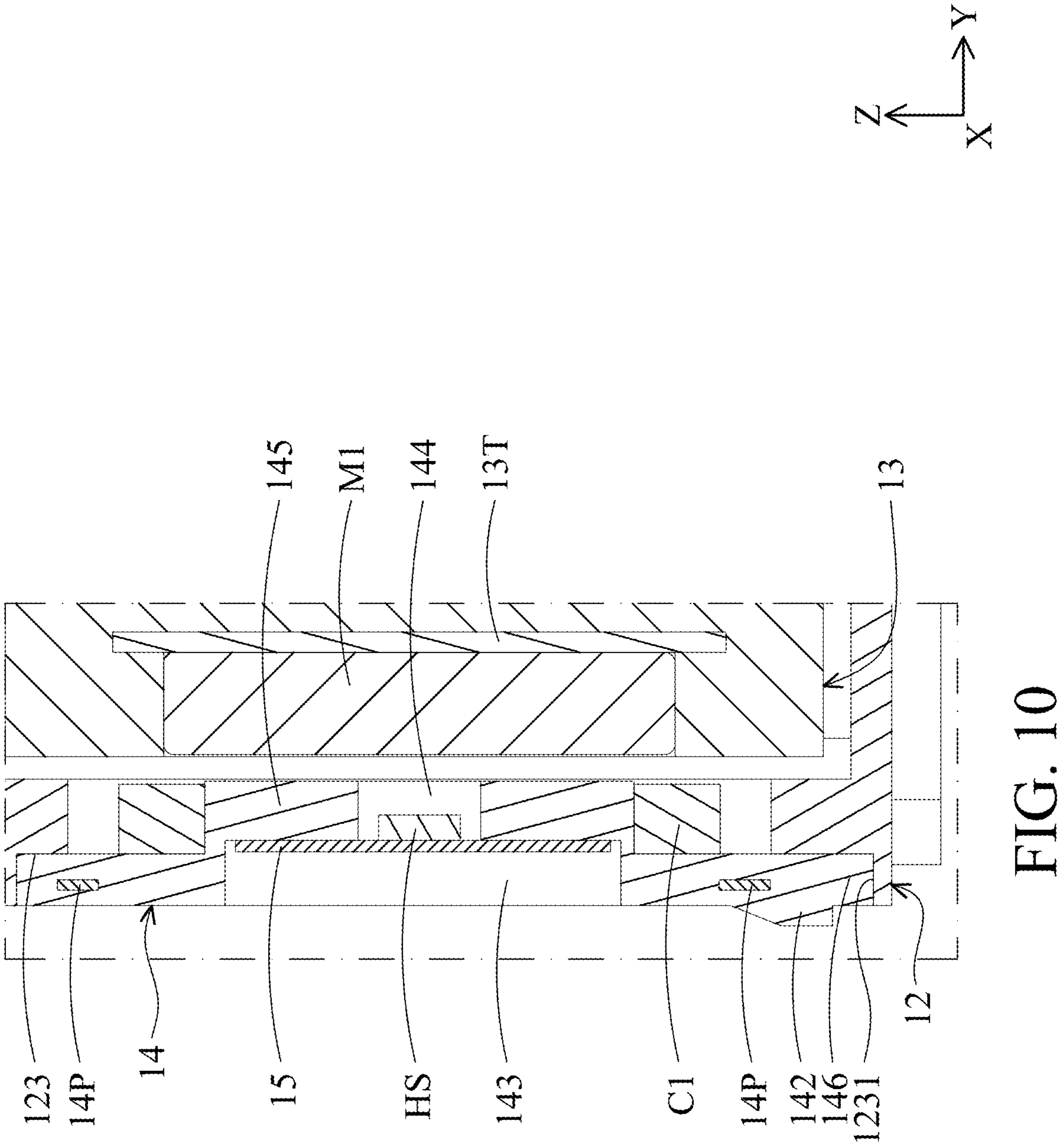
FIG. 10 shows a cross-sectional diagram of the base 12, the holder 13, the substrate 14, and the circuit board 15 after assembly.
Figure 11:
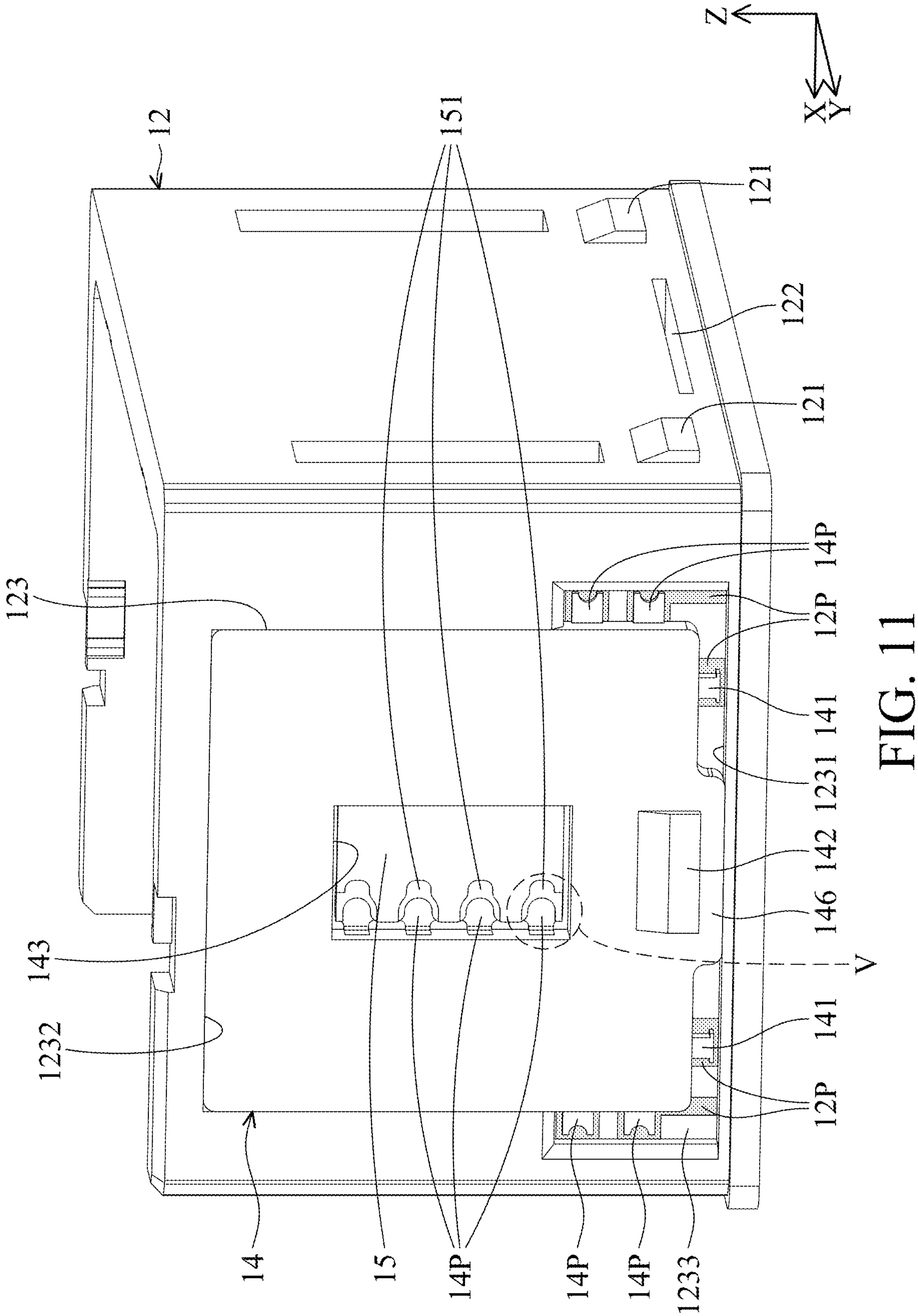
FIG. 11 shows a perspective diagram of the base 12, the holder 13, the substrate 14, and the circuit board 15 after assembly.

FIG. 10 shows a cross-sectional diagram of the base 12, the holder 13, the substrate 14, and the circuit board 15 after assembly. FIG. 11 shows a perspective diagram of the base 12, the holder 13, the substrate 14, and the circuit board 15 after assembly.

Referring to FIG. 10, the sensor HS on the circuit boards 15 is accommodated in the through hole 144 after assembly of the driving mechanism 10. The sensor HS is configured to detect the displacement of the first magnetic element M1. In this embodiment, the circuit board 15 is entirely accommodated in the cavity 143 of the substrate 14, and it does not protrude from the cavity 143 along the Y axis.

Specifically, a metal sheet 13T with high magnetic permeability is embedded in the plastic holder 13 (FIG. 10), wherein the first magnetic element M1 is situated between the first coil C1 and the metal sheet 13T. With the metal sheet 13T embedded in the plastic holder 13, the magnetic filed strength between the first magnetic element M1 and the first coil C1 can be enhanced, so as to improve the driving force and efficiency of the driving mechanism 10.

It can be seen in FIGS. 10-11 that a protrusion 146 is formed on the bottom side of the substrate 14 and located close to the winding posts 141. During assembly, the protrusion 146 may abut an end surface 1231 on the lower side of the recess 123 (or abut another end surface 1232 on the upper side of the recess 123), whereby the substrate 14 can be precisely positioned and restricted in a predetermined position of the recess 123. Here, the end surfaces 1231, 1232 are perpendicular to the Z axis.

The winding post 141 may have a T-shaped or L-shaped structure. During assembly, the wires (not shown) on the winding posts 141 and the circuit elements 14P protruding from the substrate 14 can be individually bonded to the conductive members 12P that are exposed to the surface of the base 12 by soldering/welding (FIG. 11). Here, the conductive members 12P are embedded in the base 12 by insert molding. Thus, the first coil C1 can be electrically connected to the external circuit through the wires, the conductive members 12P, and the printed circuit element 11 below the base 12.

Still referring to FIG. 11, several conductive traces 151 (e.g. metal traces) are embedded in the circuit board 15 and exposed to a side of the circuit board 15. An end of each conductive trace 151 is connected to the sensor HS, and the other end of the conductive trace 151 is bonded to the circuit element 14P by soldering/welding, as the bonding area V shows in FIG. 11. Moreover, the circuit element 14P protruding from the substrate 14 can be bonded to the conductive members 12P that are exposed to the surface of the base 12 by soldering/welding. With the configuration, the sensor HS can be electrically connected to the external circuit the printed circuit element 11 sequentially through the conductive traces 151, the circuit element 14P, and the conductive members 12P, wherein the sensor HS and the bonding area V are on opposite sides (inner and outer sides) of the circuit board 15.

In some embodiments, both of the sensor HS and the bonding area V may be located on the same side (outer side) of the circuit board 15 and face the housing 16, and the present invention is not limited to the embodiments.

Here, the conductive members 12P are exposed to the surface 1233 of the recess 123. The surface 1233 is parallel to the Z axis, and the bonding area V of the conductive trace 151 and the circuit element 14P is located closer to the first coil C1 than the surface 1233 along the Y axis.

Figure 12:
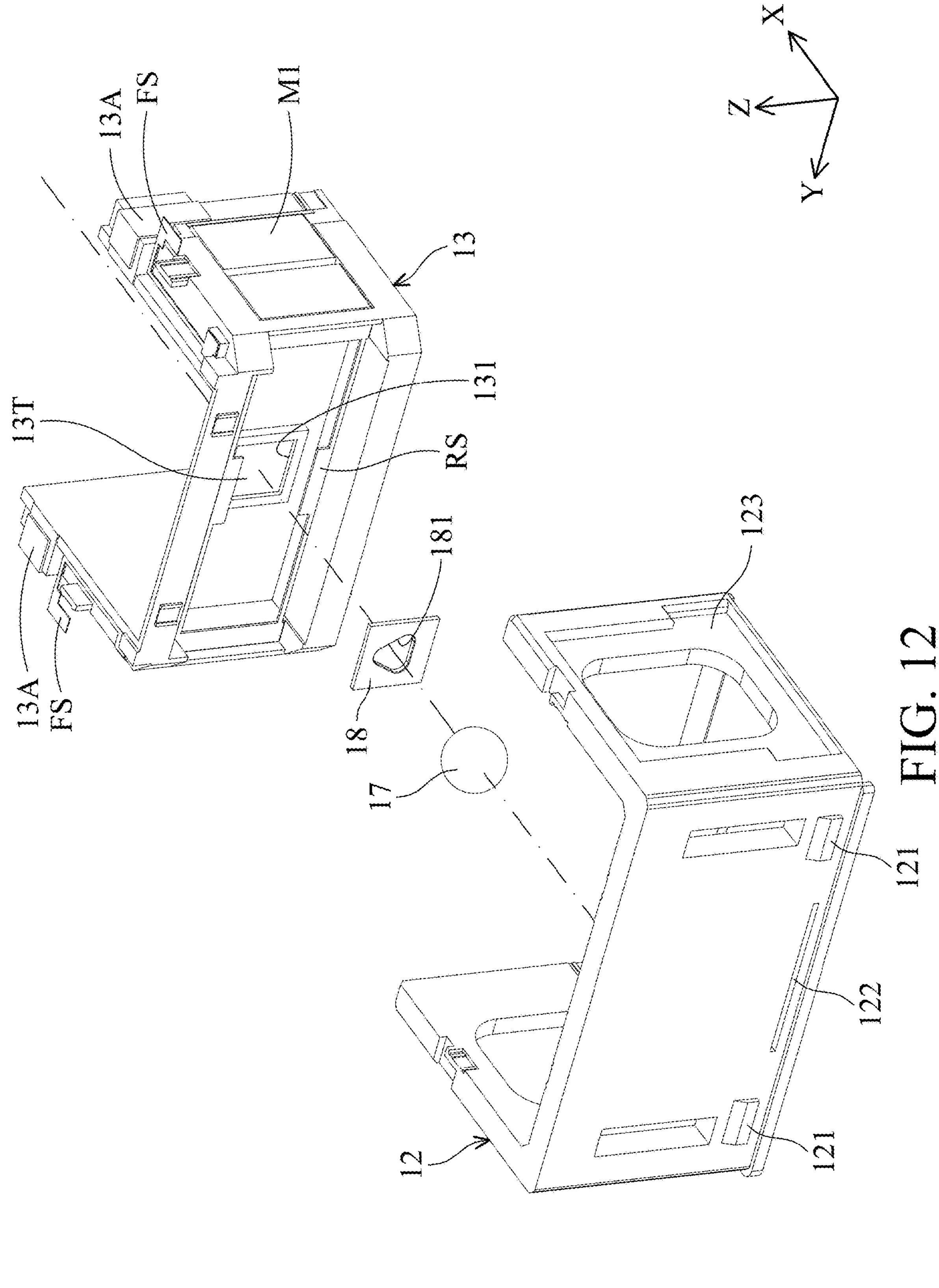
FIG. 12 shows an exploded diagram of the base 12, the holder 13, the ball joint 17, and the pad 18 before assembly.
Figure 13:
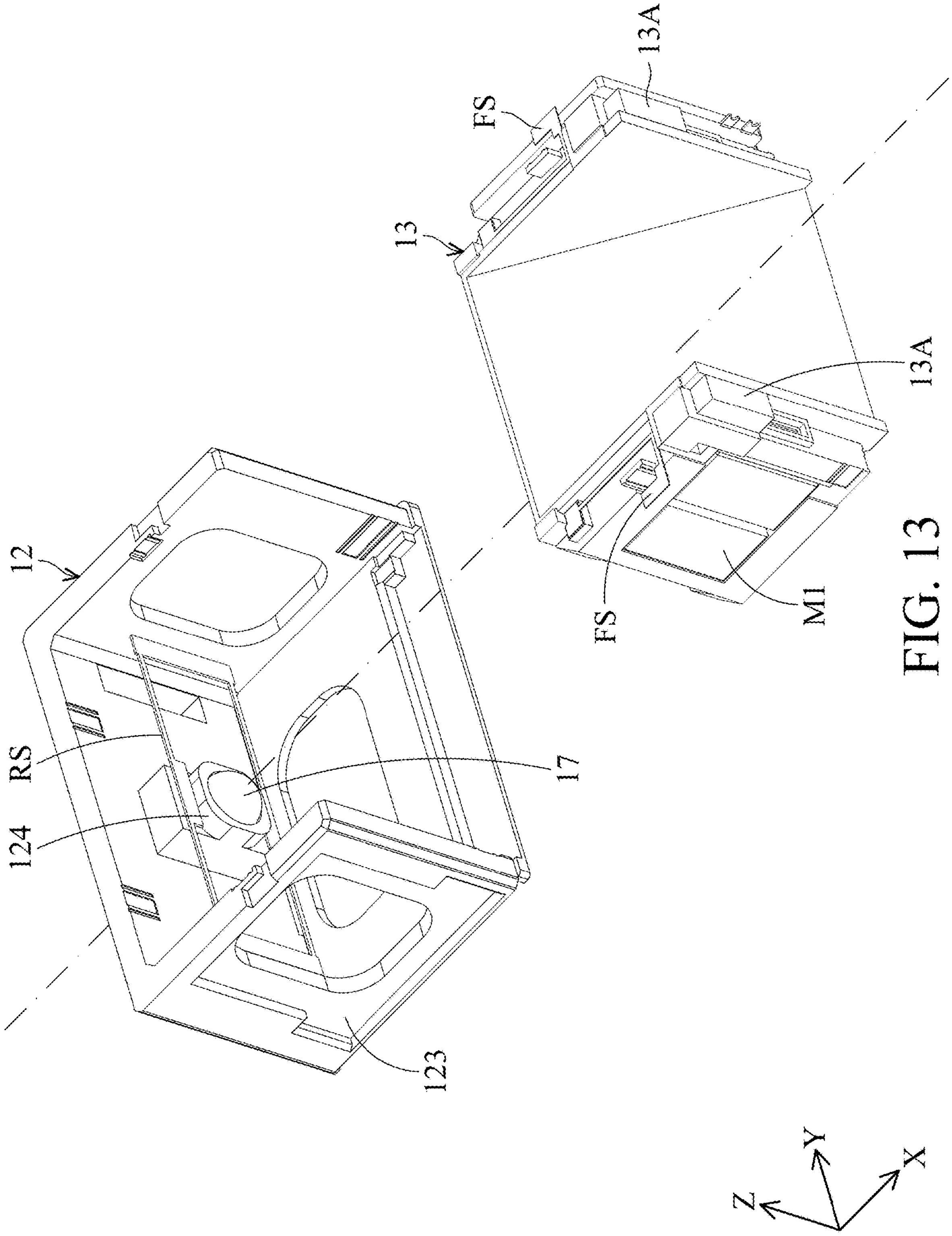
FIG. 13 shows an exploded diagram of the base 12 and the holder 13 before assembly.

FIG. 12 shows an exploded diagram of the base 12, the holder 13, the ball joint 17, and the pad 18 before assembly. FIG. 13 shows an exploded diagram of the base 12 and the holder 13 before assembly.

Referring to FIGS. 12-13, a rectangular cavity 131 is formed on the rear side of the holder 13. The metal sheet 13T is exposed to the bottom surface of the cavity 131, and a metal pad 18 is disposed in the cavity 131 (FIG. 12). The ball joint 17 (e.g. ceramic ball) is affixed in a seat 124 on the inner side of the base 12 and contacts the pad 18. After assembly of the driving mechanism 10, a part of the ball joint 17 extends an opening 181 at the center of the pad 18 and contacts the metal sheet 13T.

It should be noted that the opening 181 of the pad 18 may have a polygonal shape (e.g. triangular shape), and the ball joint 17 contacts at least two sides of the polygonal opening 181. Therefore, the pressure from the ball joint 17 can be dispersed evenly to prevent the metal sheet 13T from being damaged by the ball joint 17.

In this embodiment, the pad 18 may comprise stainless steel or other metal material and may be bonded on the metal sheet 13T by soldering/welding, wherein the pad 18 and the metal sheet 13T have different magnetic permeabilities. It can be seen in FIGS. 12 and 13 that two buffer elements 13A are disposed on the front side of the holder 13, wherein the hardness of the buffer elements 13A is less than the hardness of the plastic holder 13. Thus, the holder 13 can be protected by the buffer elements 13A from direct impact on other components.

Figure 14:
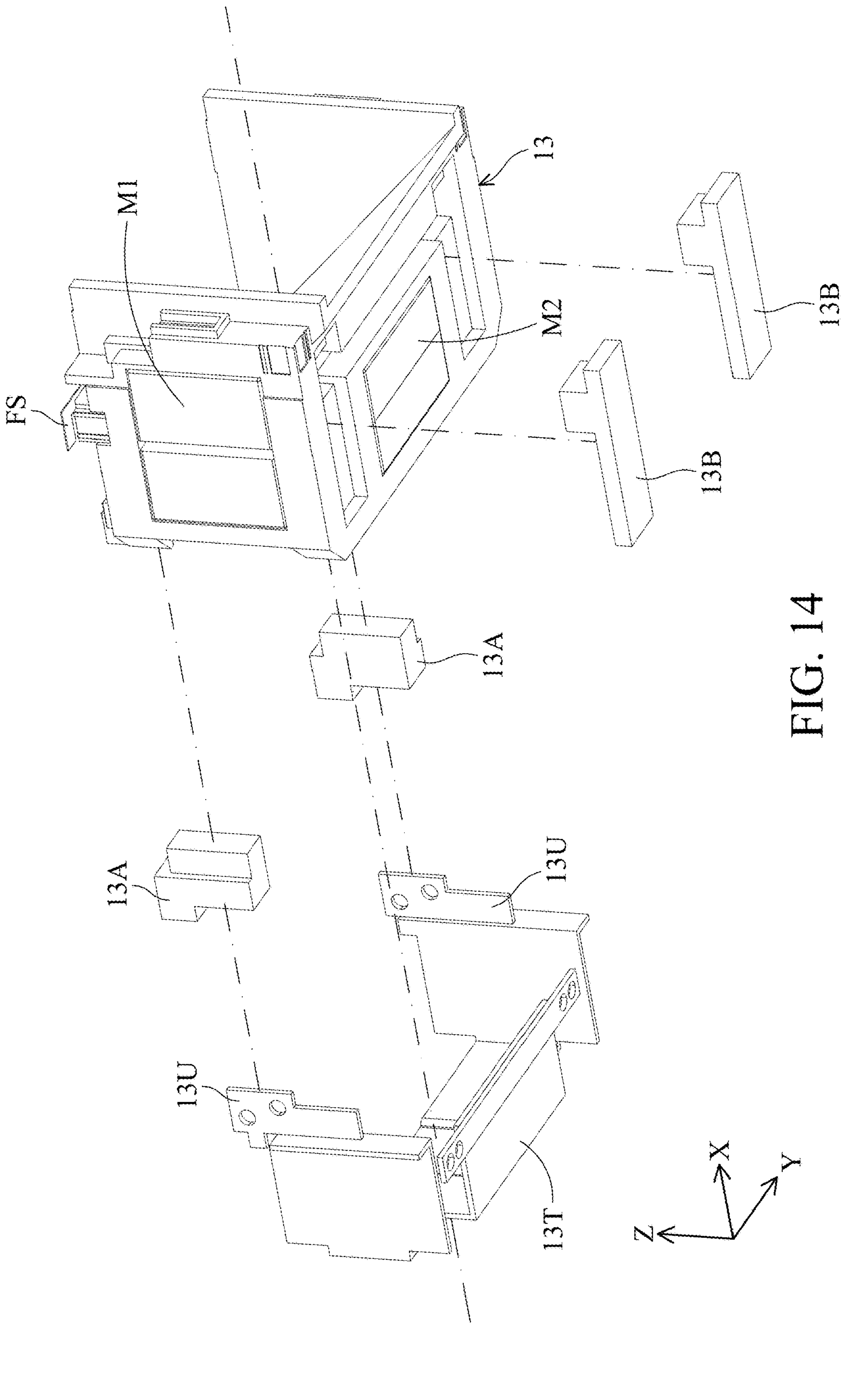
FIG. 14 shows an exploded diagram of the buffer elements 13A, the cushion elements 13B, the metal sheet 13T, the support members 13U and the holder 13 before assembly.
Figure 15:
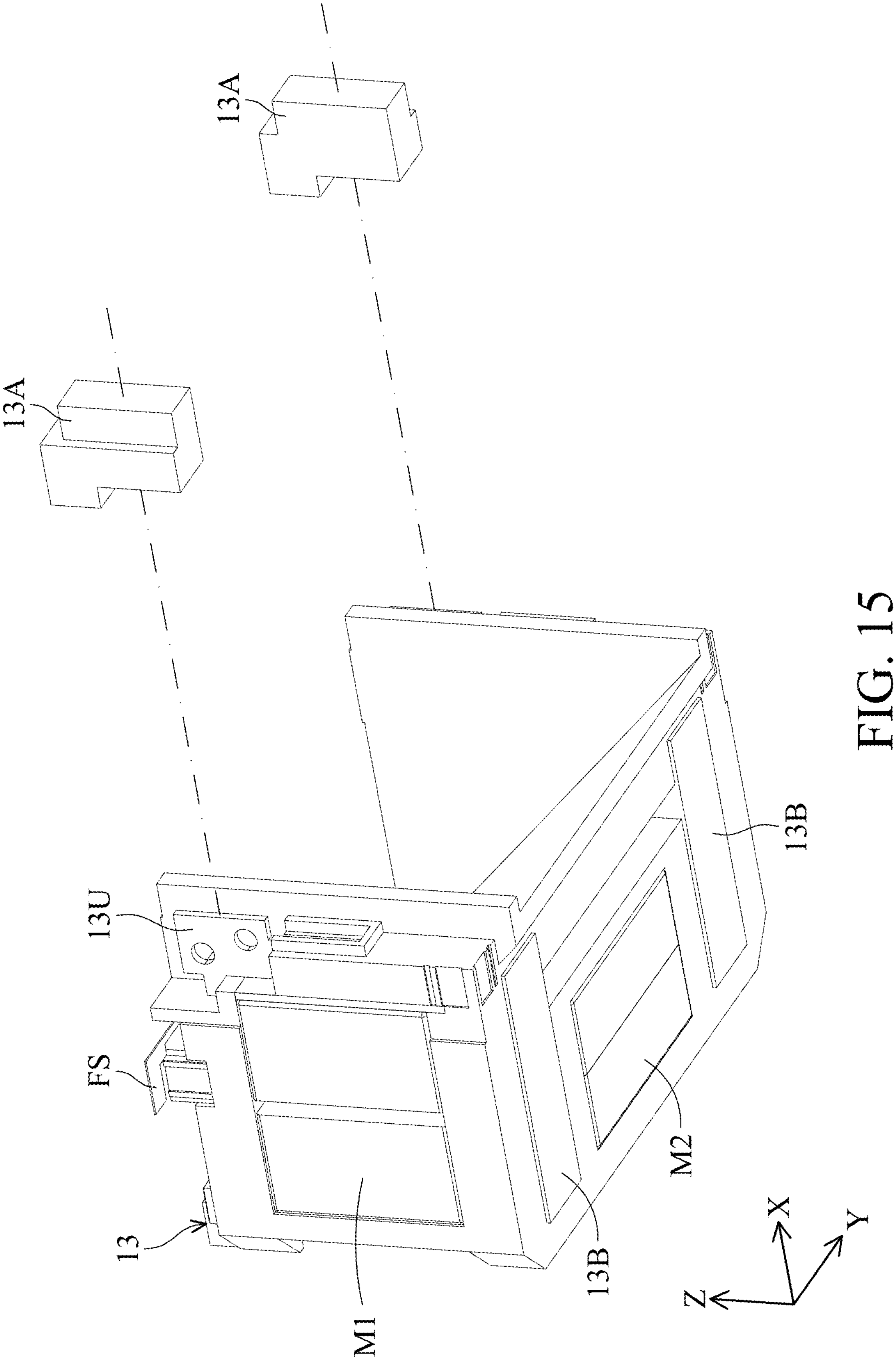
FIG. 15 shows another exploded diagram of the buffer elements 13A before assembled to the support members 13U.

FIG. 14 shows an exploded diagram of the buffer elements 13A, the cushion elements 13B, the metal sheet 13T, the support members 13U and the holder 13 before assembly. FIG. 15 shows another exploded diagram of the buffer elements 13A before assembled to the support members 13U.

Referring to FIGS. 14-15, two metal support members 13U are bonded on the C-shaped metal sheet 13T by soldering/welding. The buffer elements 13A may encompass the support members 13U by insert molding, wherein the support members 13U and the metal sheet 13T have different magnetic permeabilities. In this embodiment, the magnetic permeability of the metal sheet 13T is higher than the magnetic permeability of the support members 13U and the pad 18, and the hardness of the pad 18 is higher than the hardness of the metal sheet 13T.

Moreover, as shown in FIGS. 14-15, two cushion elements 13B are disposed on the bottom side of the holder 13, and the magnetic element M2 are located between the two cushion elements 13B, wherein the buffer elements 13A and the cushion elements 13B may comprise plastic or rubber.

Figure 16:
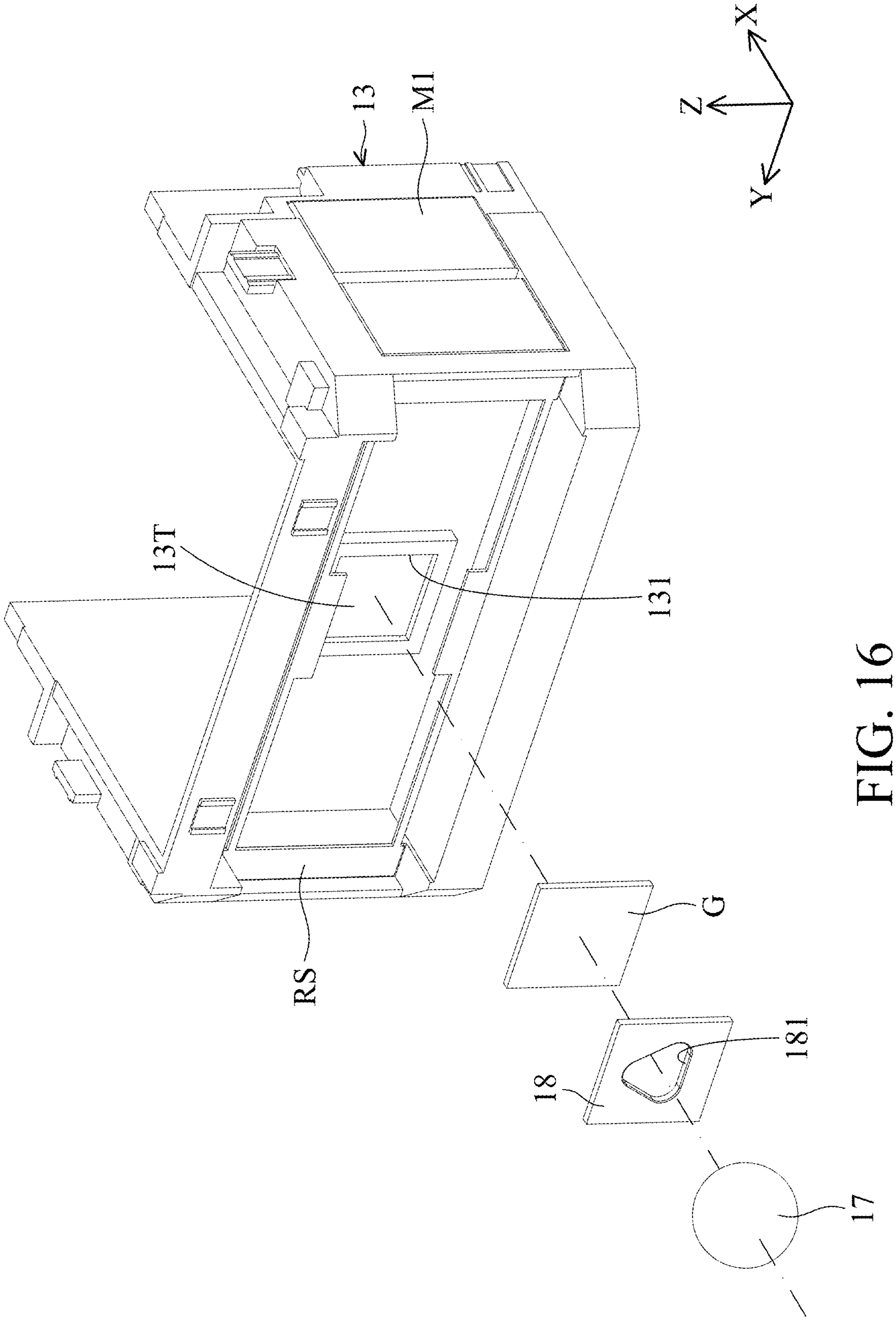
FIG. 16 shows an exploded diagram of the holder 13, the ball joint 17, the pad 18, and the damping gel G before assembly.
Figure 17:
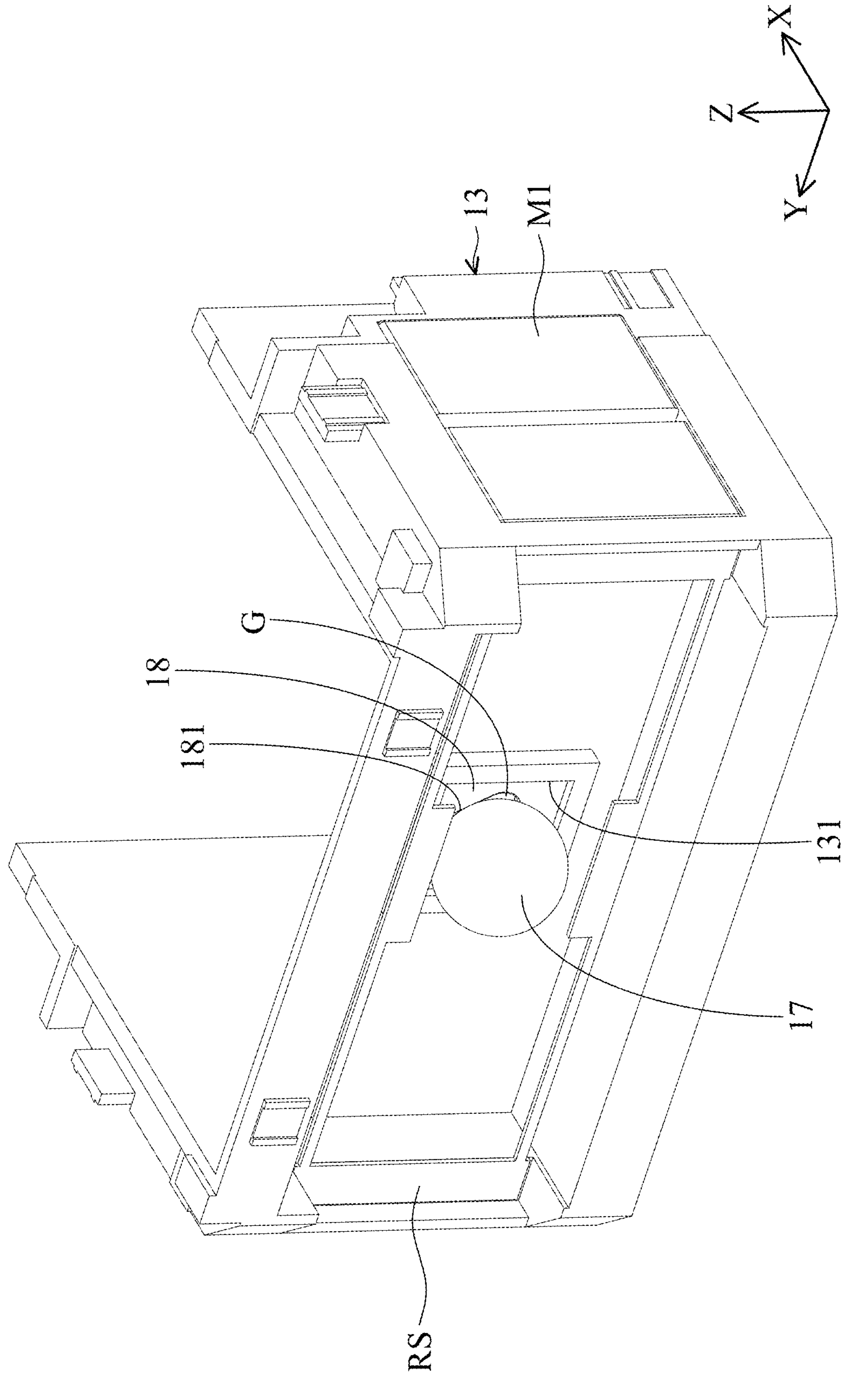
FIG. 17 shows a perspective diagram of the holder 13, the ball joint 17, the pad 18, and the damping gel G after assembly.

FIG. 16 shows an exploded diagram of the holder 13, the ball joint 17, the pad 18, and the damping gel G before assembly. FIG. 17 shows a perspective diagram of the holder 13, the ball joint 17, the pad 18, and the damping gel G after assembly.

Referring to FIGS. 16-17, in another embodiment of the invention, the damping gel G may be disposed in the cavity 131 of the holder 13 to connect the pad 18 to the metal sheet 13T. The damping gel G is in contact with the ball joint 17 after assembly, thus protecting the metal sheet 13T from being impacted by the ball joint 17.

Figure 18:
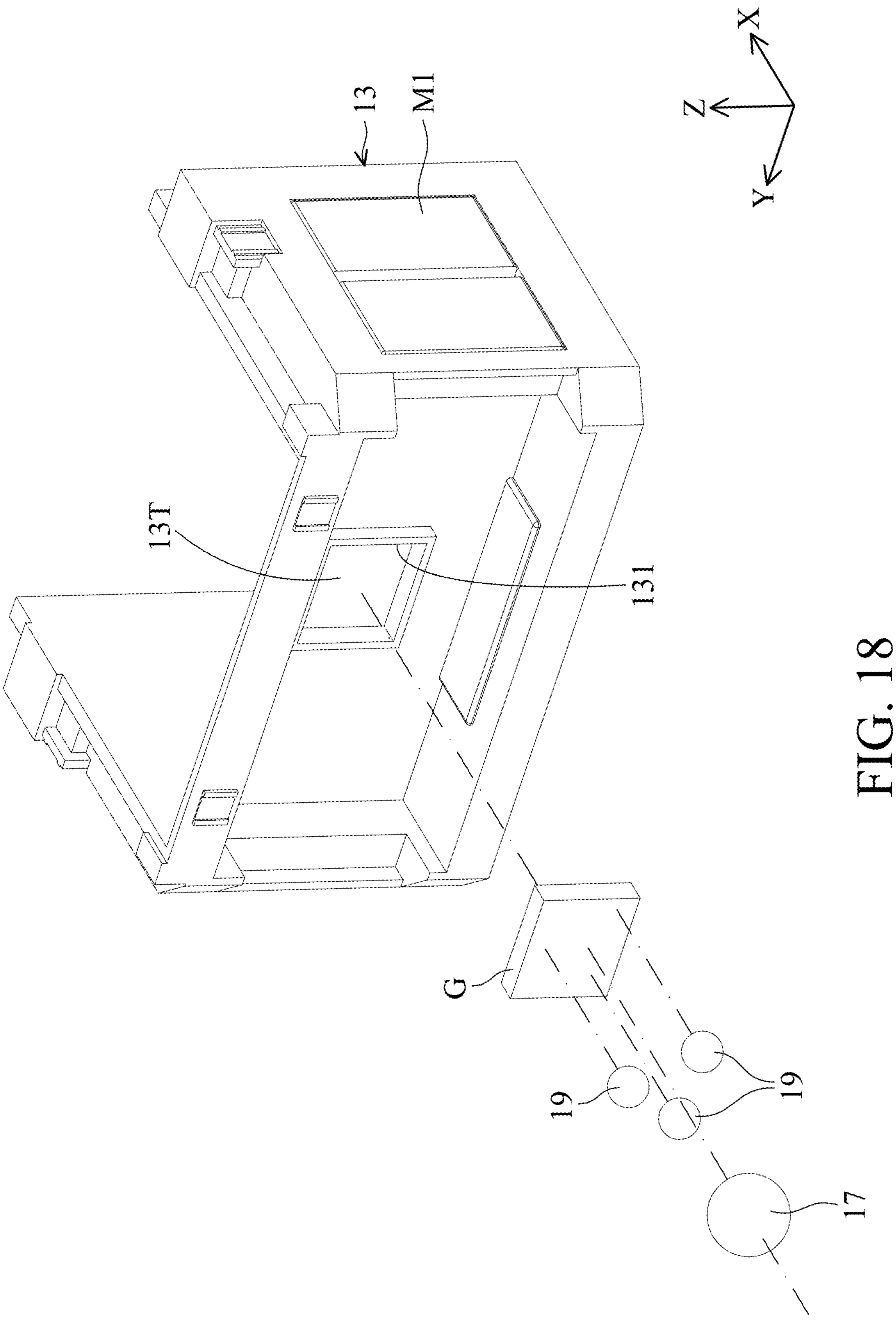
FIG. 18 shows an exploded diagram of the holder 13, the ball joint 17, the ball elements 19, and the damping gel G before assembly.
Figure 19:
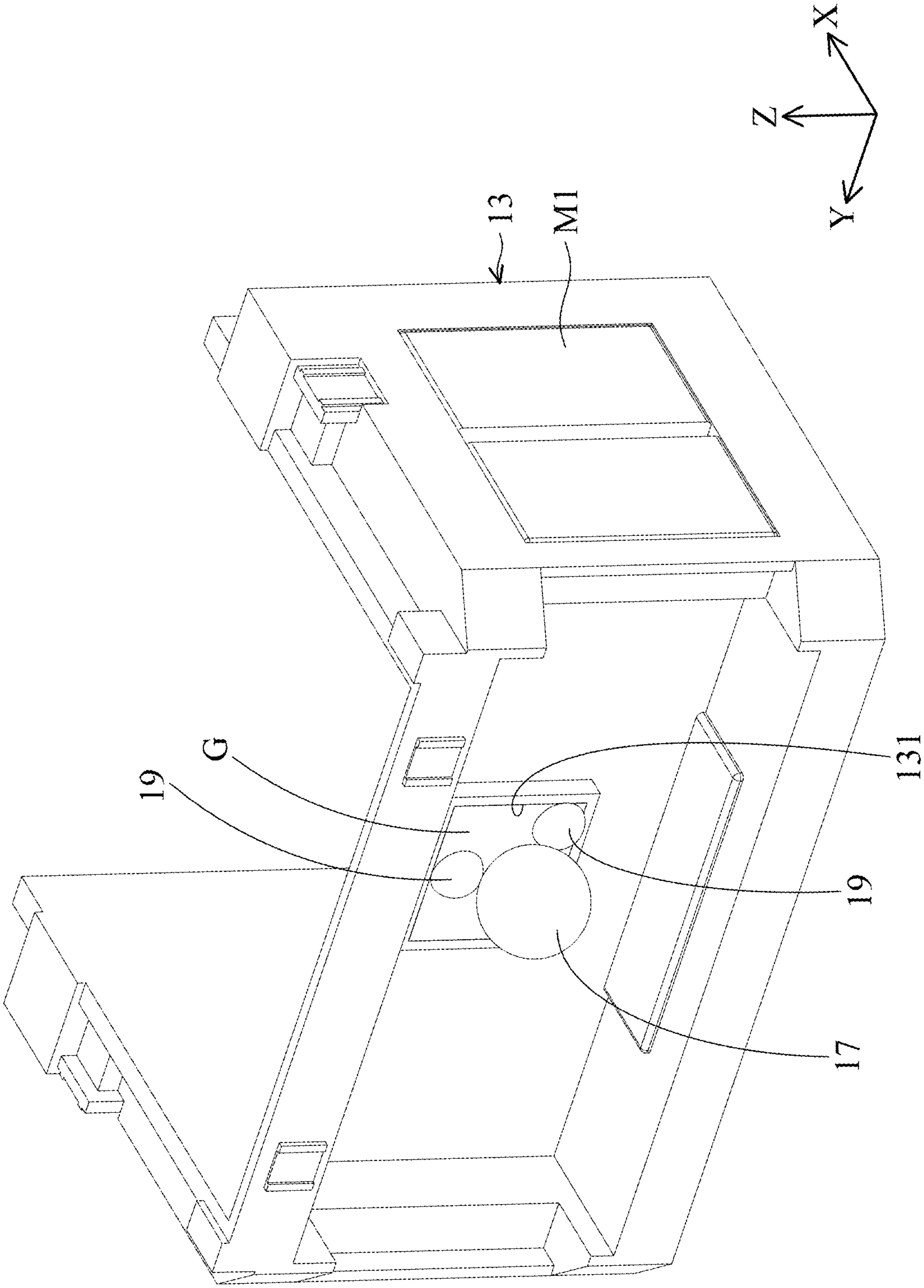
FIG. 19 shows a perspective diagram of t the holder 13, the ball joint 17, the ball elements 19, and the damping gel G after assembly.

FIG. 18 shows an exploded diagram of the holder 13, the ball joint 17, the ball elements 19, and the damping gel G before assembly. FIG. 19 shows a perspective diagram of t the holder 13, the ball joint 17, the ball elements 19, and the damping gel G after assembly.

Referring to FIGS. 18-19, in another embodiment of the invention, the damping gel G is disposed in the cavity 131 of the holder 13, and several ball elements 19 (e.g. ceramic balls) are disposed in the cavity 131 and contact the damping gel G. Thus, the ball joint 17 can be supported by the ball elements 19 with at least two contact points, wherein the diameter of the ball joint 17 is greater than the diameter of the ball elements 19.

As the ball elements 19 are positioned in the cavity 131 and restricted by the sidewalls of the cavity 131, the ball elements 19 can contact and stably support the ball joint 17 from different directions. Therefore, the pressure from the ball joint 17 can be dispersed evenly to prevent the holder 13 and the metal sheet 13T from being damaged by the ball joint 17.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification.

As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for moving an optical element, comprising:
- a fixed part;
- a movable part, movably connected to the fixed part for holding the optical element; and
- a driving assembly, configured for moving the movable part relative to the fixed part; and
- a substrate and a circuit board, wherein the fixed part includes a base and a housing connected to each other, the substrate is affixed to the base, the circuit board is affixed in a cavity of the substrate, and the driving assembly includes a first magnetic element disposed on the movable part and a first coil disposed on the substrate, wherein the circuit board and the first coil are disposed on opposite sides of the substrate.

2. The driving mechanism as claimed in claim 1, wherein the substrate forms a protrusion extending through the first coil.

3. The driving mechanism as claimed in claim 2, further comprising a wire and conductive member, wherein the substrate further forms a winding post, the wire connects the coil to the winding post, the substrate is received in a recess of the base, and the conductive member is embedded in the base and exposed to a surface of the recess, wherein the wire is wound on the winding post and electrically connected to the conductive member which is exposed to the surface of the recess.

4. The driving mechanism as claimed in claim 3, wherein an external light enters the optical element in a vertical direction, and the surface is parallel to the vertical direction, wherein the wire and the conductive member are connected to each other by soldering or welding.

5. The driving mechanism as claimed in claim 4, wherein the recess has an end surface perpendicular to the vertical direction, and the substrate abuts the end surface.

6. The driving mechanism as claimed in claim 5, wherein the substrate further forms a protrusion located adjacent to the winding post and abutting the end surface.

7. The driving mechanism as claimed in claim 2, further comprising an electronic element, a conductive trace embedded in the circuit board, a circuit element embedded in the substrate, and a conductive member embedded in the base, wherein the electronic element is disposed on the circuit board and electrically connected to the conductive trace, the conductive trace is exposed to a side of the circuit board, the substrate is disposed in a recess of the base, and the conductive member is exposed to a surface of the recess, wherein the circuit element electrically connects the conductive member to the conductive trace.

8. The driving mechanism as claimed in claim 7, wherein the circuit element is connected to the conductive member by soldering or welding, and the conductive trace and the circuit element are electrically connected to each other in a bonding area that is located closer to the first coil than the surface of the recess.

9. The driving mechanism as claimed in claim 8, wherein the bonding area and the electronic element are located on opposite sides of the circuit board.

10. The driving mechanism as claimed in claim 8, wherein the bonding area and the electronic element are located on the same side of the circuit board and facing the housing.

11. The driving mechanism as claimed in claim 7, wherein the electronic element comprises a magnetic field sensor.

12. The driving mechanism as claimed in claim 7, wherein the substrate further forms a through hole extending through the protrusion for receiving the electronic element.

13. The driving mechanism as claimed in claim 1, further comprising a glue disposed in the cavity to adhere the substrate and the circuit board to the housing.

14. The driving mechanism as claimed in claim 1, wherein the circuit board is entirely accommodated in the cavity of the substrate.

15. The driving mechanism as claimed in claim 1, wherein the housing forms a slot, and the substrate forms a nub joined in the slot.

16. The driving mechanism as claimed in claim 15, wherein cavity and the nub are on the same side of the substrate.

17. The driving mechanism as claimed in claim 1, wherein the housing forms a slot, and the base forms a nub joined in the slot.

18. The driving mechanism as claimed in claim 17, wherein the base further forms a slit extending through a sidewall of the base, and the slit and the nub are on the same side of the base.

19. The driving mechanism as claimed in claim 18, further comprising a printed circuit element disposed on a bottom side of the base, and the slit is aligned to a gap between the movable part and the printed circuit element.

* * * * *